(12) United States Patent
Deng

(10) Patent No.: US 7,602,804 B2
(45) Date of Patent: Oct. 13, 2009

(54) SMOOTH CAPACITY EXPANSION METHOD AND SYSTEM FOR DATA COMMUNICATION PRODUCTS

(75) Inventor: Chaojun Deng, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 671 days.

(21) Appl. No.: 09/827,127

(22) Filed: Apr. 5, 2001

(65) Prior Publication Data
US 2001/0021955 A1 Sep. 13, 2001

(30) Foreign Application Priority Data
Aug. 1, 2000 (CN) ................. 00 1 22430

(51) Int. Cl.
*H04L 12/66* (2006.01)
(52) U.S. Cl. ..................... 370/463; 710/300
(58) Field of Classification Search ............... 370/410, 370/422, 463, 501, 502, 293; 710/8, 10, 710/301
See application file for complete search history.

(56) References Cited

U.S. PATENT DOCUMENTS

| | | | | |
|---|---|---|---|---|
| 5,734,656 A | * | 3/1998 | Prince et al. | 370/401 |
| 6,018,529 A | * | 1/2000 | Toth | 370/463 |
| 6,052,276 A | * | 4/2000 | Do et al. | 361/684 |
| 6,122,273 A | | 9/2000 | Cantwell et al. | |
| 6,128,300 A | * | 10/2000 | Horton | 370/395.65 |
| 6,310,882 B1 | * | 10/2001 | Lorenz et al. | 370/401 |
| 6,667,973 B1 | * | 12/2003 | Gorshe et al. | 370/376 |
| 2002/0118638 A1 | * | 8/2002 | Donahue et al. | 370/229 |
| 2006/0007946 A1 | * | 1/2006 | Kastenholz et al. | 370/401 |

FOREIGN PATENT DOCUMENTS

EP 0977457 A 2/2000

* cited by examiner

*Primary Examiner*—Seema S Rao
*Assistant Examiner*—Rhonda Murphy
(74) *Attorney, Agent, or Firm*—Townsend and Townsend and Crew LLP

(57) ABSTRACT

This invention discloses a method for smooth capacity expansion of data communication product, and a smooth capacity expandable system of data communication. Architecture of the system at least comprises circuit card and switched network card; and further comprises interface card of switched network, interface transfer card and connection optical fiber. Based on these, it provides one kind of multiple frameworks structure with interconnection between frameworks. When the capacity is expanded, the original circuit cards and switched network cards keep unchanged, only smoothly increases the switched network cards and numbers of circuit card frameworks. Therefore, it implements smooth capacity expansion and client investment protection at the same time. With adding backup cards, it also implements capacity expansion without interrupting the service.

7 Claims, 6 Drawing Sheets

SMOOTH CAPACITY EXPANSION METHOD AND SYSTEM FOR DATA COMMUNICATION PRODUCTS

CROSS REFERENCES TO RELATED APPLICATIONS

Figure 1:
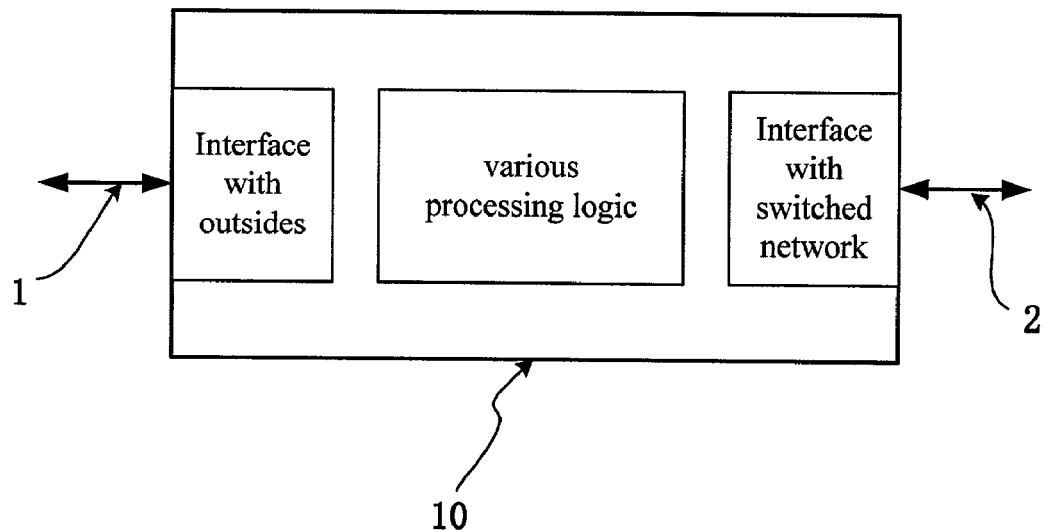

This application claims priority to Chinese Patent Application No. 00122430.1, filed Aug. 1, 2000, commonly assigned.

FIELD OF THE INVENTION

The present invention relates generally to a data communication system, and more particularly to a method for implementing smooth capacity expansion of data communication products and a data communication system, which is available for smooth capacity expansion.

BACKGROUND OF THE INVENTION

At present, client and market requires more and more capacity of the data communication products, such as ATM exchange, router etc. Architecture of the present ATM exchange, router etc. mainly includes circuit card, switched network card, and back plane connecting circuit card and switched network. Generally, it is a single framework structure. Accompanying with the increase of capacity, design of the products faces with the following technical problems:

a) When capacity is more than hundreds of Gbit, there are many circuit cards, such as POS interface circuit card, ATM interface circuit card and Giga-bit interface card etc. Power consumption of the whole machine is larger, it is difficult to implement them with only one framework. Especially when the capacity of the product is over 160 Gbit, with present technology, the technical problems of structure cannot be solved with a single framework, it must use multiple frameworks. With multiple frameworks, there are problems, such as interconnection between frameworks, main card and backup card switching etc., without successful design scheme.

b) Different market of data communication has different requirement of rated capacity. Therefore, the manufacturer is asked to provide series of products, such as 10 Gbit, 40 Gbit, 80 Gbit, 160 Gbit, 320 Gbit, 640 Gbit, 1.2 Tbit and several tens Tbit. At present, different series products provided by different manufacturers have different architectures. Although part of the manufacturers implement circuit card compatibility for one or two series in single framework, but the architecture needs to be changed. There is no successful solution with smooth capacity expansion for all series or from 40 Gbit to Tbit series.

c) As data communication develops rapidly, requirement of capacity will be larger and larger. When client purchases product of data communication, it is according to the requirement at that time. Period of time later, usually the capacity needs to be expanded. At present, when capacity expansion is needed, most of the manufacturers asks to purchase the new generation product which makes most of the old products could not be used again. In this case, the client needs to pay more investment for capacity expansion. Therefore, when capacity expansion, it is valuable to protect as much as possible the original investment of client. For product of data communication, investment of circuit cards occupies more then 60% of the hardware cost. Obviously, when system upgrade, circuit card compatibility will directly influence the client investment and expansion cost. According to the present technology, when capacity expansion, it is often solved by replacing the product, it means when capacity is difficult to satisfy requirement, expansion problem is solved by replacing less capacity product with larger capacity product. It directly conducts whole upgrade of client equipment and upgrade cost is expensive.

SUMMARY OF THE INVENTION

The present invention provides a method to implement smoothly capacity expansion for products of data communication, and a smooth capacity expandable system for data communication. It implements smooth capacity expansion from Gbit to Tbit. When capacity is expended, the original equipment can also be used and the client investment is protected.

According to the present invention, a method of implementing smooth capacity expansion for data communication products, architecture of the data communication products at least includes circuit card, switched network card and back plane, the method comprises:

Set up a special framework for switched network card. Switched network card, which is set in the framework, creates interconnection with interface card of switched network through the interface with circuit card on it and back plane.

Set up multiple framework s for circuit card. Circuit card, which is set in the framework, creates interconnection with interface transfer card through the interface switched network on it and back plane, and each circuit card corresponds one interface transfer card.

Interface transfer card and interface card of switched network correspond with each other one by one, and are interconnected with optical fiber.

When increasing capacity, increase smoothly switched network cards and numbers of circuit card framework s to implement smooth capacity expansion.

The above mentioned interface card of switched network will be designed as miniature structure. Multiple miniature interface cards of switched network are inserted on a passive base card. Each of the miniature interface cards of switched network can be inserted or removed independently. It connects with switched network card through the passive base card and back plane.

The above mentioned interface transfer card will be designed as miniature structure. Multiple miniature cards of interface transfer are inserted on a passive base card. Each of the miniature cards of interface transfer can be inserted or removed independently. It connects with circuit card through the passive base card and back plane.

The above mentioned switched network card equips with backup card. When the main card stops working, the backup card will replace the main card to assure system works continuously.

The above mentioned circuit card equips with backup card. When the main card stops working, the backup card will replace the main card to assure system works continuously.

According to the present invention, a smooth capacity expandable system for data communication, its architecture at least comprises circuit card and switched network card, it is characterized with:

The said data communication system further comprises interface card of switched network and interface transfer card. The said circuit card connects with switched network card through interface transfer card and interface card of switched network.

According to the said data communication system of the invention its architecture further comprises back plane. Switched network card connects with interface card of switched network through interface of circuit card on it and back plane. Circuit card connects with interface transfer card through interface of switched network on it and back plane.

According to the said data communication system of the invention, it is further set up a special framework for switched network card. Inside the framework, it is at least set up the said switched network card and interface card of switched network; switched network card interconnects with interface card of switched network through interface of circuit card on it and back plane. It is further set up multiple frameworks for circuit card. Inside the frameworks, it is set up the said circuit card and interface transfer card; circuit card interconnects with interface transfer card through interface of switched network on it and back plane. And each circuit card corresponds with an interface transfer card. Interface transfer card correspond with interface card of switched network one by one, their connections are set by optical fiber.

When capacity of the system is expanded, it keeps original switched network cards, circuit cards and back planes unchanged. Smooth capacity expansion is implemented by increasing smoothly switched network cards and numbers of circuit card frameworks.

According to the said data communication system of the invention, it also further comprises passive base card. The said interface card of switched network can be miniature structure. Multiple interface miniature cards of switched network are inserted on a passive base card. Each of the miniature cards can be inserted and removed independently. They connect with switched network cards through the passive base card and back plane.

According to the said data communication system of the invention, it also further comprises passive base card. The interface transfer card can be miniature structure. Multiple interface transfer cards are inserted on a passive base card. Each of the miniature cards can be inserted and removed independently. They connect with circuit cards through the passive base card and back plane.

According to the said data communication system of the invention, the said switched network cards are equipped with backup cards. When the main card stops working, the backup card will replace it to assure the system works continuously.

According to the said data communication system of the invention, the said circuit cards are equipped with backup cards. When the main card stops working, the backup card will replace it to assure the system works continuously.

The said interface of circuit card, which is on the switched network card, and the said interface of switched network, which is on the circuit card, is all using the same interface standard. Multiple pair of the interfaces uses the same speed.

The invention solves the interconnection between frameworks by using the interface transfer card, interface card of switched network and optical fiber. It has broken limitation of a framework space and volume, and makes capacity expansion is possible. When the capacity is expanded, it keeps all original circuit cards and switched network cards unchanged; in this way, client investment is protected and the cost of upgrade and capacity expansion is decreased greatly.

THE DRAWINGS

Figure 2:
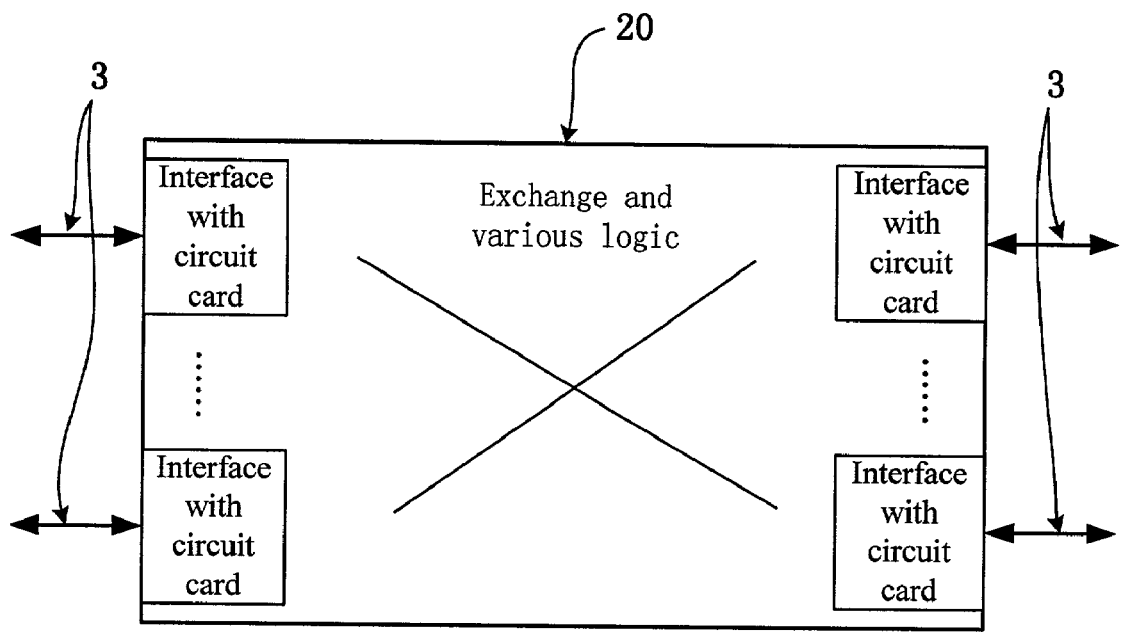
Figure 3:
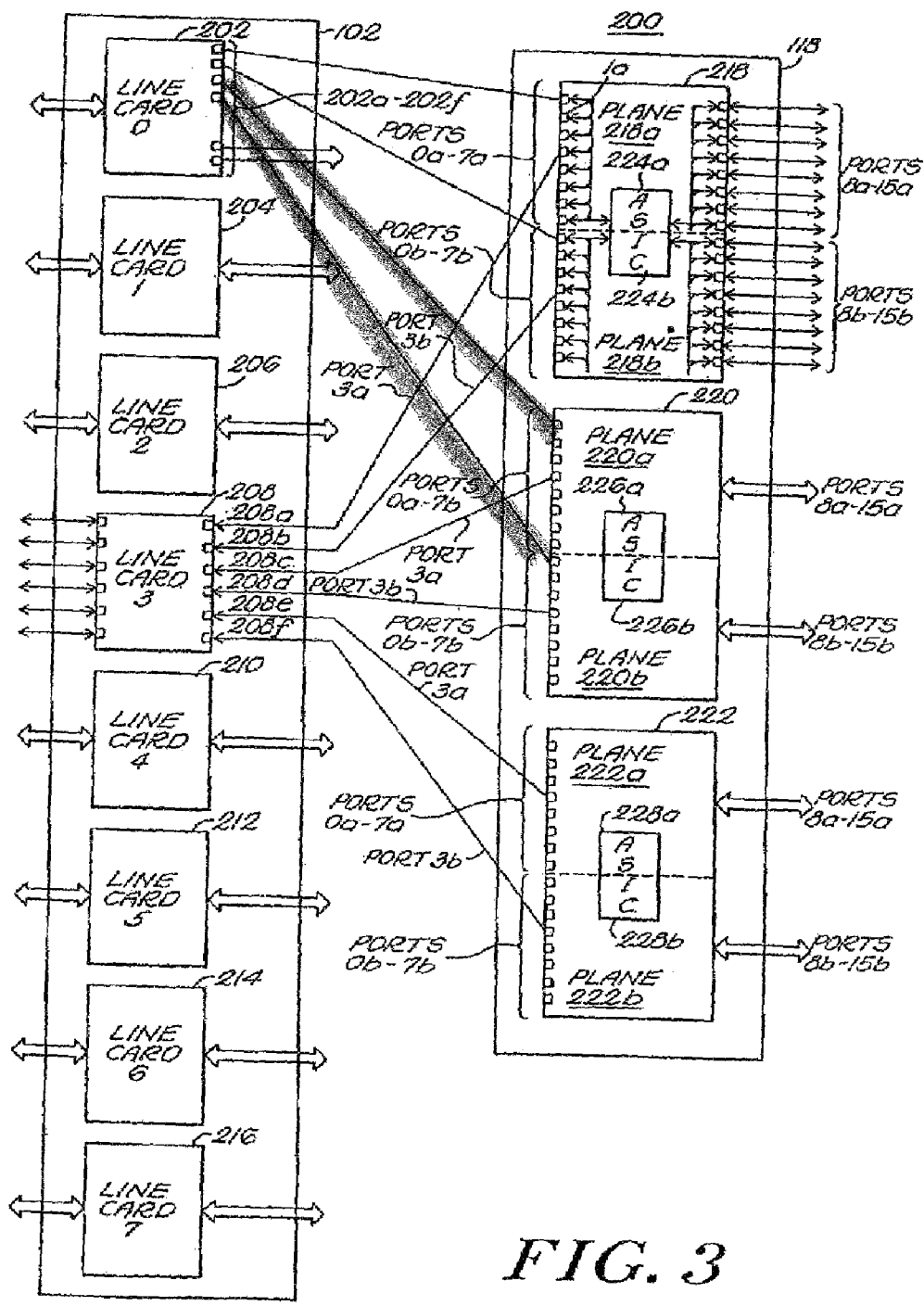
Figure 4:
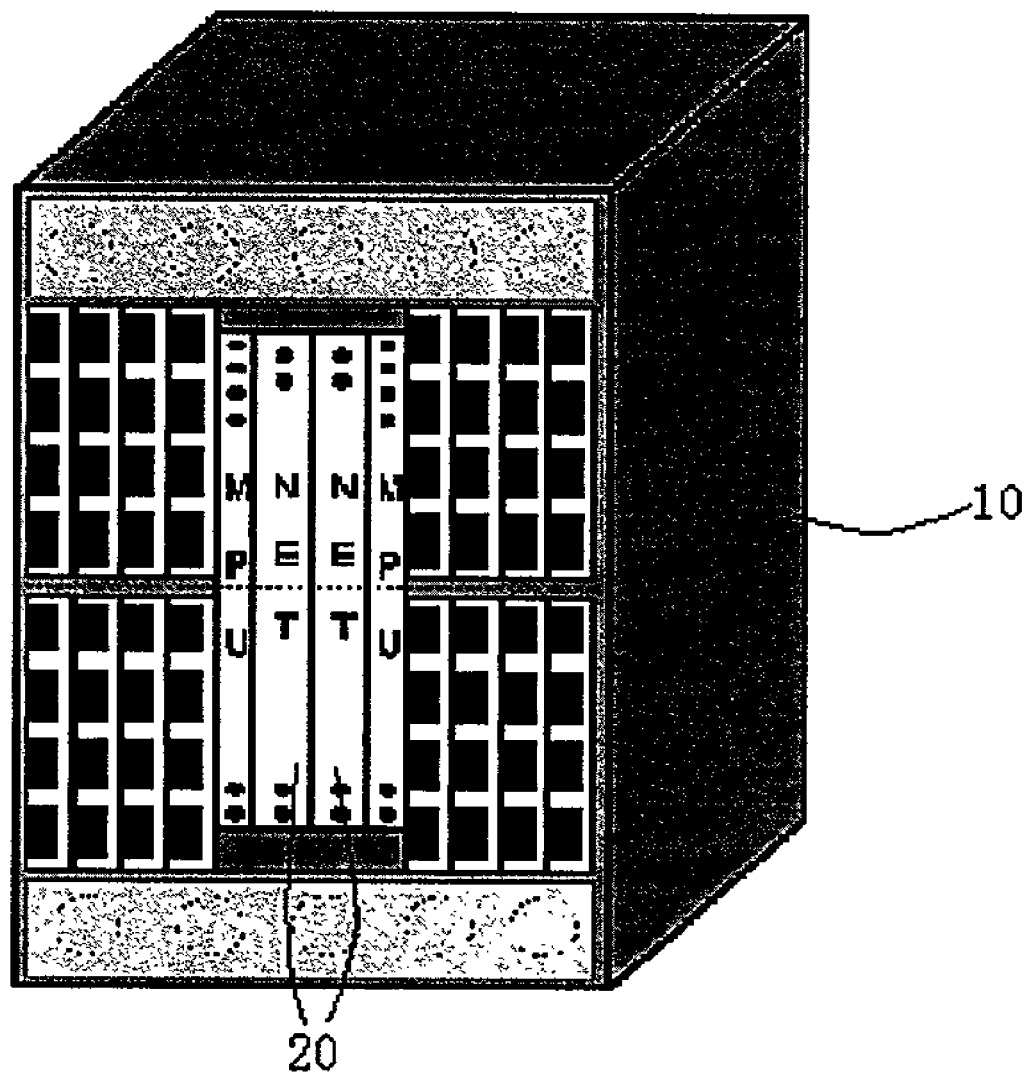
Figure 5:
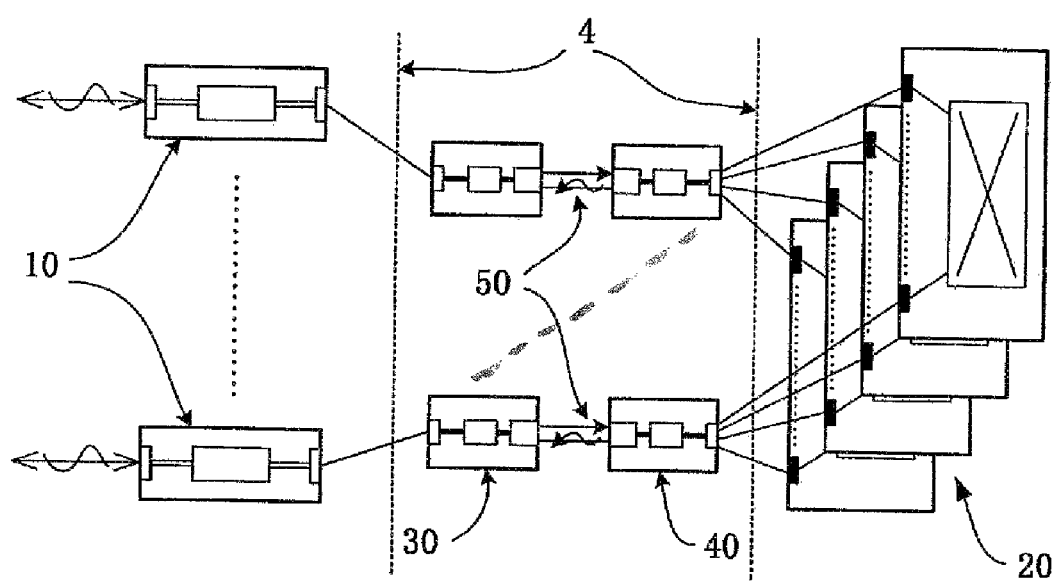
Figure 6:
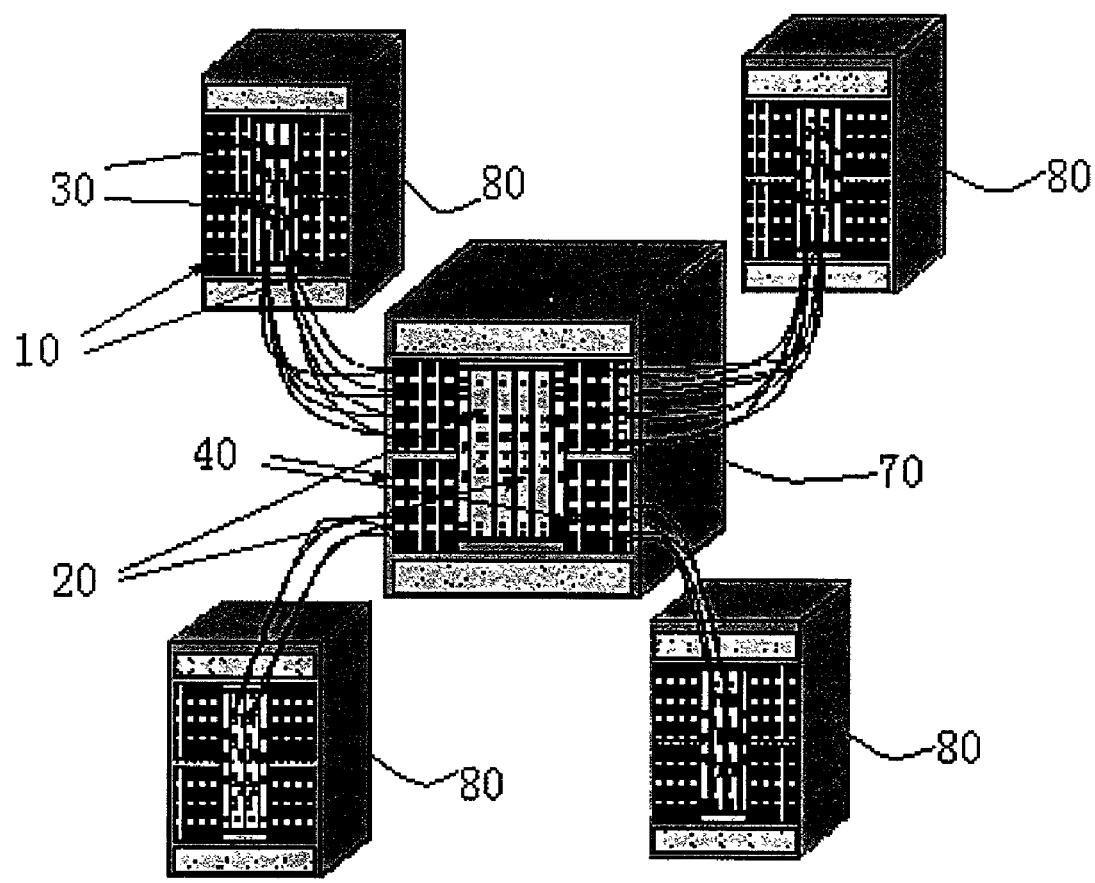
Figure 7:
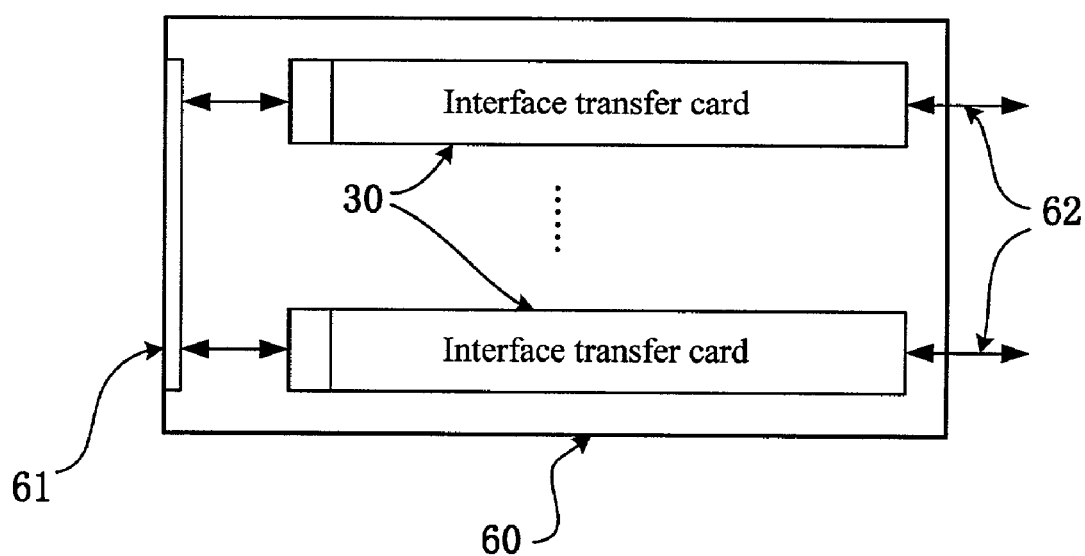

FIG. 1 schematic structure of circuit card.
FIG. 2 schematic structure of switched network card.
FIG. 3 schematic interconnection between switched network card and circuit card in single framework structure.
FIG. 4 outside view of mechanical structure for single framework.
FIG. 5 schematic interconnection of the invention.
FIG. 6 outside view of mechanical structure of the invention.
FIG. 7 schematic diagram of base card.

DETAILED DESCRIPTION OF THE INVENTION

In the following combining with the Figures, the invention is described in detail from circuit card structure, single framework structure to multiple frameworks structure in sequence. Among them, multiple frameworks structure and the expansion mode from single framework to multiple frameworks are more important to the invention.

Reference to FIGS. 1 and 2, they are the schematic structures of circuit card 10 and switched network card 20, respectively. The circuit card 10 includes interfaces and processing control logic of various kinds. Except the interface 2 connecting with switched network needs to be restricted, client according to product requirement can define the interface 1 connecting with outsides and the others . The switched network card 20 has exchange function and logic processing function of various kinds, and includes the interface 3, which connects with circuit card 10. The interface 3 interconnects with the circuit card's switched network interface 2, they have the same standard.

Reference to FIG. 3, there is the interconnection between switched network card 20 and circuit card 10. There are two switched network cards 20, one is the main and the other is the backup, which are connected with circuit card 10 by standard interface 2 and 3. The purposes of two switched network cards 20 are for reliability.

The interconnection between switched network card 20 and circuit card 10 is internal standard interface, it is an electric signal interface. In order to the expansion is smoothly, the interface must be standardized. When capacity is less, for example less than 160 G, the product can be designed within a single framework, therefore the interface is connected through back plane 4. The physical requirements of the interface signals are: signal transmission mode is high speed, serial and differential mode; and transmission rate is over 1 G. In order to better selecting interface device, it is suggested using the standard interface device, such as interface standard of Fiber channel, Gigabit Ethernet, OIF and Infiniband and so on. General transmission rate is 1 Gb/s, 1.25 Gb/s, 1.5 Gb/s, 2.5 Gb/s and 3.125 Gb/s and supports 8B/10B signals coding. For a product only one of the transmission rate can be selected, otherwise it is difficult to have a smooth expansion. Therefore, multiple internal interfaces use same transmission rate. When the capacity is larger, it is suggested using the 2.5 Gb/s.

FIG. 3 is the scheme of basic capacity. The switched network cards 20 and the circuit cards 10 are interconnected by Back plane 4. The main card and backup card of switched network cards 20 occupies one slot, respectively. Each circuit card 10 occupies one slot. The schematic mechanical structure is shown in FIG. 4. The numbers of circuit cards 10 can be changed according to the port numbers of switched network card 20. In FIG. 4, there are 16 circuit cards 10, two switched network cards (NET) 20 and two cards of main processing unit (MPU). Switched network card 20 and other cards are interconnected by the back plane 4. The main functions of the MPU card are system management and maintenance. Two MPU cards are used for main and backup, respectively.

When system capacity is to be increased, connection between frameworks is needed. In this case for system reliability, the expansion and reliability must be better solved. The smooth expansion scheme according to the invention is:

Without changing the original circuit card 10, switched network card 20 and back plane 4.

Increasing the numbers of switched network cards 20 and putting them in a special framework for switched network card.

Increasing the numbers of circuit cards 10, which compose framework for circuit card. The multiple frameworks of circuit card are interconnected with the special framework of switched network card by parallel optical fiber. At the same time, the slot originally for switched network card 20 is used for interface card which interconnects with the special framework of switched network card.

Reference to FIG. 5, the dot line 4 is back plane, the 50 is optical fiber. In this scheme, two kinds of card are added: the one is 30 referred to as interface transfer card and the other is 40 referred to as interface card of switched network. The interface transfer cards 30 are inserted in the slots, which are inserted originally the switched network cards 20, when there is only one framework. Each circuit card 10 corresponds with one interface transfer card 30. The interface card of switched network 40 and the increasing switched network cards 20 are put in a special framework of switched network card. Each circuit card 10 corresponds with one interface card of switched network 40, the interface cards of switched network 40 and interface transfer cards 30 correspond one by one. The schematic outside view of mechanical structure of the scheme is shown in FIG. 6.

Two kinds of frameworks: one is the circuit card framework 80 including circuit cards 10 and interface transfer cards 30, another is a special framework 70 including switched network cards 20 and interface cards of switched network 40, are involved in the invention, which provides smooth capacity expansion scheme. When increasing capacity is desired, if the capacity of switched network card 20 is enough to support the increasing, the purpose of smooth capacity expansion can be got by increasing the numbers of interconnecting circuit card frameworks 80. FIG. 6 shows only four circuit frameworks and four switched network cards. In real situation, the numbers of circuit card frameworks 80 can be more and the numbers of switched network cards 20 can be more too. Smoothly increasing of capacity is implemented by smoothly increasing the circuit card frameworks 80 and switched network cards 20.

Therefore, the invention breaks the limitation of single framework and makes the implementation of smooth expansion to be real.

In the invention, in order to use sufficiently and without influence of back plane 4 in circuit card framework, the design of interface transfer card 30 must be more compact. As the function is simple and the devices are less for interface transfer card 30, its structure can be in miniature. Many interface transfer cards 30 in miniature can be inserted in a base card, each one of them can be inserted and removed independently. When replacing an interface transfer card 30, it is assured that another circuit card 10 will not be influenced, and this is an on-line exchange. The base card is a passive card. FIG. 7 is the schematic connection of the base card. Multiple pieces of interface transfer card 30 in miniature are all inserted on the passive base card 60. Passive base card 60 is inserted on the back plane by interface 61, which creates the corresponding connecting relationship between circuit card 10 and interface transfer card 30. Interface 62 is an optical fiber interface.

Similarly, the interface card of switched network 40 inserted on the special framework of switched network card can employ the same structure to make the structure more compactness.

In addition, circuit card 10 and switched network card 20 can all have backup card. When the main card is removed, or is at fault, or stops working, the backup card will replace the work of main card, to keep the system operates continuously and provides service without interrupted. Therefore, when the expansion is from signal framework to multiple frameworks, it can be first removed the backup card, then exchanged the interface transfer card 30, interface card of switched network 40 etc. After the exchanging, it is switched to operate on the backup switched network card, then exchanging the main switched network card without interrupting the service.

Simulation test shows that the invention implements smooth expansion, without interrupting the service and with reliable performance.

The said above is only an embodiment of the invention, it is not limited the scope of the invention. The invention implements the framework interconnection by adding the interface transfer card, interface card of switched network and optical fiber between circuit card and switched network card. When expansion, the original circuit card and switched network card need not make any changes, it only need to increase smoothly the numbers of switched network cards and frameworks of circuit card. In this way, it implements the smooth expansion and protects the client investment. Under the spirit and principle of the invention, any update, replacement or improvement etc. are all involved in the scope of the claims of the invention.

The invention claimed is:

1. A system for data communication, the system comprising:
    a first circuit card including one or more first interfaces and one or more first logic components for processing control;
    a first transfer card coupled to the first circuit card through at least a first base card and a first backplane, the first base card being coupled directly to both the first transfer card and the first backplane, the first base card being neither a part of the first transfer card nor a part of the first backplane, the first transfer card not being a part of the first circuit card, the first circuit card not being a part of the first transfer card;
    a second circuit card including one or more second interfaces and one or more second logic components for processing control;
    a second transfer card coupled to the second circuit card through at least a second base card and a second backplane, the second base card being coupled directly to both the second transfer card and the second backplane, the second base card being neither a part of the second transfer card nor a part of the second backplane, the second transfer card not being a part of the second circuit card, the second circuit card not being a part of the second transfer card;
    a first switched network card to at least perform an exchange function between the first circuit card and the second circuit card, the first switched network card and the first circuit card being different types of cards;
    a first interface card coupled to the first switched network card through at least a third base card and a third backplane, the third base card being coupled directly to both the first interface card and the third backplane, the third base card being neither a part of the first interface card nor a part of the third backplane, the first interface card not being a part of the first switched network card, the first switched network card not being a part of the first interface card, the third backplane and the first backplane being associated with different physical locations;

a second interface card coupled to the first switched network card through at least the third backplane;

a first data communication link connecting the first transfer card and the first interface card;

a second data communication link connecting the second transfer card and the second interface card;

wherein:
  the first transfer card, the first circuit card, and the first backplane are associated with a first framework;
  the first interface card, the second interface card, the first switched network card, and the third backplane are associated with a second framework, the first framework and the second framework being associated with different physical locations; and
  the first transfer card has no direct connection to the second interface card to assure that the second circuit card is not influenced when the first transfer card is replaced.

2. The system of claim 1 wherein each of the first data communication link and the second data communication link includes an optical fiber.

3. The system of claim 1 wherein:
the first backplane and the second backplane are the same;
the first base card and the second base card are the same.

4. A system for data communication, the system comprising:
  a first circuit card including one or more first interfaces and one or more first logic components for processing control;
  a first transfer card coupled to the first circuit card through at least a first backplane, the first transfer card not being a part of the first circuit card, the first circuit card not being a part of the first transfer card;
  a second circuit card including one or more second interfaces and one or more second logic components for processing control;
  a second transfer card coupled to the second circuit card through at least a second backplane, the second transfer card not being a part of the second circuit card, the second circuit card not being a part of the second transfer card;
  a first switched network card to at least perform an exchange function between the first circuit card and the second circuit card, the first switched network card and the first circuit card being different types of cards;
  a first interface card coupled to the first switched network card through at least a third backplane, the third backplane and the first backplane being associated with different physical locations, the first interface card not being a part of the first switched network card, the first switched network card not being a part of the first interface card;
  a second interface card coupled to the first switched network card through at least the third backplane;
  a first data communication link connecting the first transfer card and the first interface card;
  a second data communication link connecting the second transfer card and the second interface card;
  wherein:
    the first transfer card, the first circuit card, and the first backplane are associated with a first framework;
    the first interface card, the second interface card, the first switched network card, and the third backplane are associated with a second framework, the first framework and the second framework being associated with different physical locations;
    each of the first data communication link and the second data communication link includes an optical fiber; and
    the first transfer card has no direct connection to the second interface card to assure that the second circuit card is not influenced when the first transfer card is replaced.

5. The system of claim 4 wherein the first switched network card does not receive any data signal that does not transmit through a circuit card.

6. The system of claim 4, and further comprising a second switched network card coupled to both the first interface card and the second interface card.

7. The system of claim 4 wherein the first backplane and the second backplane are the same.

* * * * *

UNITED STATES PATENT AND TRADEMARK OFFICE
CERTIFICATE OF CORRECTION

PATENT NO. : 7,602,804 B2 Page 1 of 1
APPLICATION NO. : 09/827127
DATED : October 13, 2009
INVENTOR(S) : Chaojun Deng It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1000 days.

Signed and Sealed this

Fifth Day of October, 2010

David J. Kappos
*Director of the United States Patent and Trademark Office*